United States Patent
Spicer et al.

(10) Patent No.: US 10,655,072 B2
(45) Date of Patent: May 19, 2020

(54) PYROLYSIS FURNACE TUBES

(71) Applicant: ExxonMobil Chemical Patents Inc., Baytown, TX (US)

(72) Inventors: David B. Spicer, Houston, TX (US); Changmin Chun, Raritan, NJ (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/430,130

(22) Filed: Jun. 3, 2019

(65) Prior Publication Data
US 2019/0284483 A1   Sep. 19, 2019

Related U.S. Application Data

(62) Division of application No. 14/942,730, filed on Nov. 16, 2015, now Pat. No. 10,351,784.
(Continued)

(30) Foreign Application Priority Data

Apr. 3, 2015   (EP) ..................... 15248030

(51) Int. Cl.
*C10G 9/20* (2006.01)
*C10G 9/14* (2006.01)
(Continued)

(52) U.S. Cl.
CPC .......... *C10G 9/203* (2013.01); *B01J 19/2405* (2013.01); *B23K 9/048* (2013.01); *B23K 10/027* (2013.01); *C10G 9/14* (2013.01); *C10G 9/16* (2013.01); *C10G 9/36* (2013.01); *C21D 9/50* (2013.01); *C22C 19/03* (2013.01); *C22C 19/05* (2013.01); *C22C 30/00* (2013.01); *C22C 38/02* (2013.01); *C22C 38/04* (2013.01); *C22C 38/40* (2013.01);
(Continued)

(58) Field of Classification Search
CPC . C10G 9/203; C10G 9/36; C10G 9/16; C10G 9/14; C22C 38/50; C22C 38/48; C22C 38/40; C22C 38/04; C22C 38/02; C22C 19/03; C22C 19/05; C22C 30/00; C22C 38/44; B01J 19/2405; F28F 21/08; F28F 1/40; F16L 9/02; C23C 30/00; C23C 28/345; B23K 9/048; B23K 10/027; B23K 2201/20; B23K 2203/04; B23K 2203/05; B23K 2201/06; C21D 9/50; C21D 2211/004; B01F 2005/0636
See application file for complete search history.

(56) References Cited

U.S. PATENT DOCUMENTS 5,206,880 A * 4/1993 Olsson ................... C10G 9/203
148/242
2011/0245545 A1* 10/2011 Levin ....................... C07C 29/14
568/840

* cited by examiner

*Primary Examiner* — Randy Boyer
*Assistant Examiner* — Juan C Valencia

(57) ABSTRACT

The invention relates weldments useful as heat transfer tubes in pyrolysis furnaces. The invention relates to tubes that are useful in pyrolysis furnaces. The weldments include a tubular member and at least one mixing element. The tubular member comprises an aluminum-containing alloy. The mixing element comprises an aluminum-containing alloy. The mixing element's aluminum-containing alloy can be the same as or different from the tubular member's aluminum-containing alloy. Other aspects of the invention relate to pyrolysis furnaces which include such weldments, and the use of such pyrolysis furnaces for hydrocarbon conversion processes such as steam cracking.

13 Claims, 1 Drawing Sheet

Related U.S. Application Data

(60) Provisional application No. 62/092,616, filed on Dec. 16, 2014.

(51) Int. Cl.

| | | |
|---|---|---|
| C10G 9/16 | (2006.01) |
| B23K 9/04 | (2006.01) |
| C21D 9/50 | (2006.01) |
| C22C 30/00 | (2006.01) |
| C10G 9/36 | (2006.01) |
| B23K 10/02 | (2006.01) |
| C22C 38/44 | (2006.01) |
| B01J 19/24 | (2006.01) |
| C22C 19/05 | (2006.01) |
| C23C 28/00 | (2006.01) |
| C23C 30/00 | (2006.01) |
| F16L 9/02 | (2006.01) |
| F28F 1/40 | (2006.01) |
| F28F 21/08 | (2006.01) |
| C22C 19/03 | (2006.01) |
| C22C 38/02 | (2006.01) |
| C22C 38/04 | (2006.01) |
| C22C 38/40 | (2006.01) |
| C22C 38/48 | (2006.01) |
| C22C 38/50 | (2006.01) |
| B01F 5/06 | (2006.01) |
| B23K 101/06 | (2006.01) |
| B23K 101/20 | (2006.01) |
| B23K 103/04 | (2006.01) |

(52) U.S. Cl.
CPC .............. *C22C 38/44* (2013.01); *C22C 38/48* (2013.01); *C22C 38/50* (2013.01); *C23C 28/345* (2013.01); *C23C 30/00* (2013.01); *F16L 9/02* (2013.01); *F28F 1/40* (2013.01); *F28F 21/08* (2013.01); *B01F 2005/0636* (2013.01); *B23K 2101/06* (2018.08); *B23K 2101/20* (2018.08); *B23K 2103/04* (2018.08); *B23K 2103/05* (2018.08); *C21D 2211/004* (2013.01)

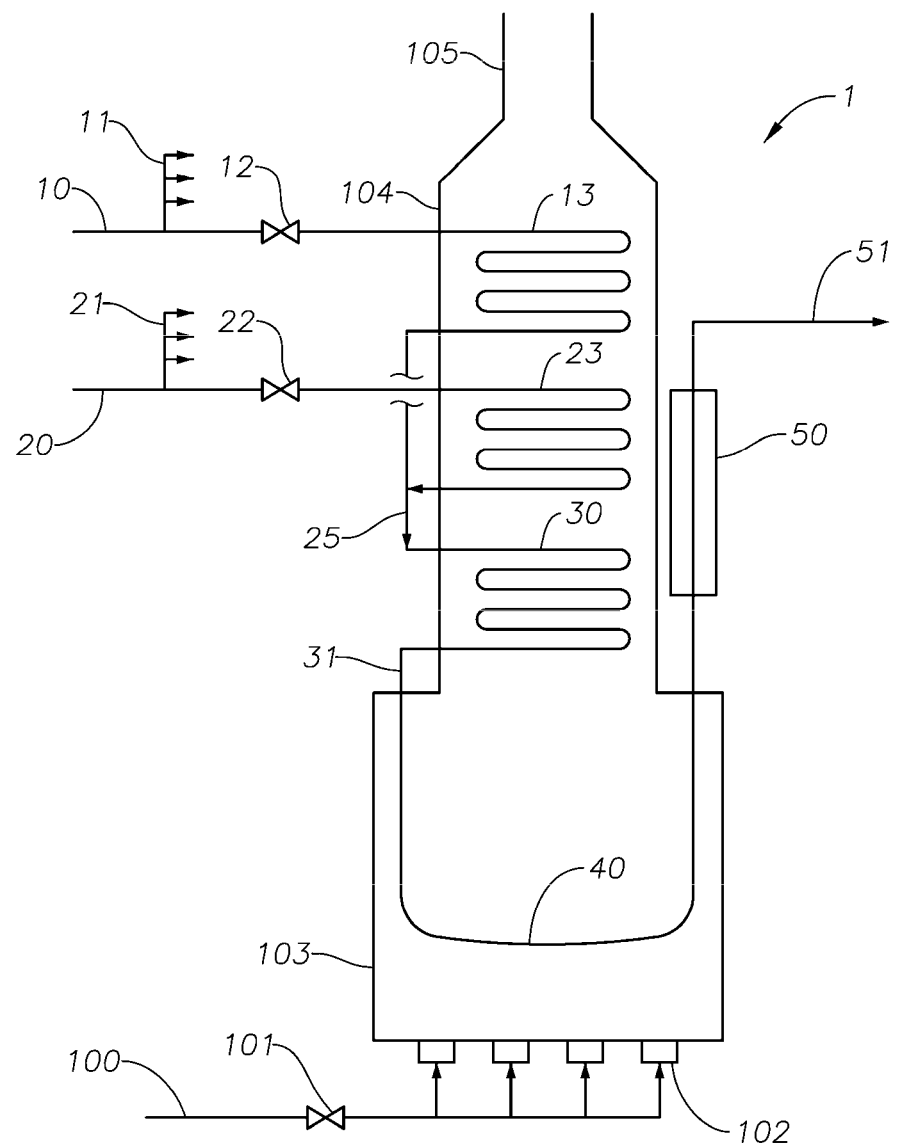

PYROLYSIS FURNACE TUBES

PRIORITY CLAIM

This application is a divisional application of U.S. patent application Ser. No. 14/942,730 filed Nov. 16, 2015, and claims priority to and the benefit of U.S. Provisional Patent Application Ser. No. 62/092,616, filed Dec. 16, 2014 and European Patent Application No. 15248030.7 filed Apr. 3, 2015 which are all incorporated herein by reference. This application is related to U.S. Provisional Patent Application Ser. No. 62/199,357 filed on Jul. 31, 2015 which is also incorporated by reference.

FIELD OF THE INVENTION

The invention relates to tubes that are useful in pyrolysis furnaces. The tubes are weldments of a tubular member and at least one mixing element. The tubular member comprises an aluminum-containing alloy. The mixing element also comprises an aluminum-containing alloy, which can be the same as or different from the tubular member's aluminum-containing alloy. The invention also relates to pyrolysis furnaces which include such weldments, and the use of such pyrolysis furnaces for hydrocarbon conversion processes such as steam cracking.

BACKGROUND OF THE INVENTION

Thermal cracking of hydrocarbon feeds in the presence of steam ("steam cracking") is a commercially important technology for producing light olefins such as ethylene, propylene, and butadiene. Typical hydrocarbon feeds include, e.g., one or more of ethane and propane, naphtha, heavy gas oils, crude oil, etc. Steam cracking furnaces for carrying out steam cracking generally include a convection section, a radiant section located downstream of the convection section, and a quenching stage located downstream of the radiant section. Typically, at least one burner is included in the steam cracking furnace for providing heat to the convection and radiant sections. The burners are typically located in at least one firebox, the firebox being proximate to the radiant section, with the convection section being located downstream of the radiant section with respect to the flow of heated gases (typically combustion gases) produced by the burner. Tubular conduits ("tubes") are utilized for at least (i) conveying the hydrocarbon feed, steam, and mixtures thereof through the furnace's convection and radiant sections, (ii) transferring heat to the hydrocarbon and/or steam inside the tube for the steam cracking reactions, (iii) conveying product effluent away from the radiant section, (iv) conveying a decoking mixture for removing coke, e.g., from inside convection tubes and/or radiant tubes, and (v) conveying decoking effluent away from the radiant section. Certain steam cracker tubes are heat-transfer tubes. Typically, heat-transfer tubes located in the convection section are called "convection tubes", and those located in the radiant section are called "radiant tubes". When the convection tubes and/or radiant tubes are arranged in coils, it is typical to call these "convection coils" and "radiant coils".

In one conventional process, a hydrocarbon feed is introduced into at least one of the convection coils. The convection coil's external surface is exposed to the heated gases conducted away from the burner. The hydrocarbon feed is preheated by indirectly transferring heat from the heated gases to hydrocarbon feed located inside the convection coil. Steam is combined with the pre-heated hydrocarbon feed to produce a hydrocarbon+ steam mixture. At least one additional convection coil is utilized for pre-heating the hydrocarbon+ steam mixture, e.g., to a temperature at or just below the temperature at which significant thermal cracking occurs.

The preheated hydrocarbon+ steam mixture is conducted via cross-over piping from the convection section to at least one radiant tube located in the radiant section. Conventional radiant tubes are typically formed from a steam cracker alloy comprising chromium, iron, and nickel, as well as various other elements, usually in low concentration, e.g., ≤5.0 wt. %, to obtain desired performance. The preheated hydrocarbon+steam mixture is indirectly heated in the radiant tube, primarily by the transfer of heat from the burner to the radiant tube's exterior surface, e.g., radiant heat transfer from flames and high temperature flue gas produced in one or more burners located in the fire box, radiant heat transfer from the interior surfaces of the firebox enclosure, convective heat transfer from combustion gases traversing the radiant section, etc. The transferred heat rapidly raises the temperature of the pre-heated hydrocarbon+steam mixture to the desired coil outlet temperature (COT), which typically ranges from 1450° F. (788° C.) for some very heavy gas oil feeds to 1650° F. (871° C.) for ethane or propane feeds.

Heat transferred to the preheated hydrocarbon+steam mixture located in one or more of the radiant tubes results in thermal cracking of at least a portion of the mixture's hydrocarbon to produce a radiant coil effluent comprising molecular hydrogen, light olefin, other hydrocarbon byproducts, unreacted steam, and unreacted hydrocarbon feed. Transfer line piping is typically utilized for conveying radiant coil effluent from the radiant section to the quenching stage. Coke accumulates in the furnace during the thermal cracking, e.g., on internal surfaces of the convection tubes and especially on internal surfaces of the radiant tubes. After an undesirable amount of coke has accumulated, a flow of decoking mixture, typically an air-steam mixture, is substituted for the hydrocarbon+steam mixture for removing accumulated coke. Decoking effluent is conducted away. Following coke removal, the flow of hydrocarbon+steam mixture is restored to the decoked tubes. The process continues, with alternating pyrolysis (thermal cracking) mode and decking mode.

Selectivity to light olefins during pyrolysis mode is favored by short contact time, high temperatures, and low hydrocarbon partial pressures. For this reason radiant tubes typically operate at a temperature (measured at the tube metal) as high as 2050° F. (1121° C.). Radiant tubes are therefore manufactured from alloys having desirable properties at high temperature, such as high creep-strength and high rupture-strength. Since the tubes are exposed to a carburizing environment during hydrocarbon pyrolysis, the alloy is typically carburization-resistant. And since the tubes are exposed to an oxidizing environment during decoking, the alloy is typically oxidation-resistant. Conventional heat-transfer tube alloys include austenitic Fe—Cr—Ni heat resistant steels having variations of steam cracker alloys based on a composition having 25 wt. % chromium and 35 wt. % nickel (referred to as a "25 Cr/35 Ni alloy"), or a composition having 35 wt. % chromium and 45 wt. % nickel (referred to as a "35 Cr/45 Ni alloy"). It is conventional to employ differing compositions of minor alloying elements in order to enhance high temperature strength and/or carburization resistance.

In conventional alloys, a surface oxide comprising $Cr_2O_3$ typically forms during pyrolysis. This oxide is believed to protect iron and nickel sites from contact with the hydrocarbon during pyrolysis mode, thereby lessening the amount of undesirable coke formation. It is observed, however, that under more severe pyrolysis conditions, e.g., conditions typically utilized for increasing light olefin yield, the formation of this protective oxide layer is suppressed in favor of carbon-containing phases, e.g., $Cr_3C_2$, $Cr_7C_3$, and/or $Cr_{23}C_6$. Accordingly, discontinuities develop over time in the carburization-resistant scale located on the tube's inner surface, resulting in iron and nickel exposure to the hydrocarbon feed, leading to an increase in the rate of coke formation.

In an attempt to overcome this difficulty, U.S. Patent Application Pub. No. 2012/0097289 discloses increasing the tube's carburization resistance by employing an alloy containing 5 to 10 wt. % aluminum. The alloy is said to form an $Al_2O_3$ scale during pyrolysis mode. It is reported that an $Al_2O_3$ scale remains in a stable oxide even under conditions where chromium preferentially forms carbides rather than oxides. Since such carburization-resistant alloys have a lower creep-strength and lower rupture-strength than do conventional heat-transfer tube alloys that do not contain aluminum, the reference discloses a tube structure wherein a continuous inner member formed from the aluminum-containing alloy is bonded to the inner surface of a tubular outer member which comprises a higher-strength alloy. While such tubes suppress coke formation, their dual-layer construction is economically demanding.

It is conventional to lessen the amount of aluminum in the steam cracker alloy in order to increase strength and thereby obviate the need for an outer member. See, e.g., U.S. Pat. No. 8,431,230, which discloses an aluminum-containing steam cracker alloy comprising 2 to 4 wt. % aluminum.

It is also conventional to increase the tube's heat transfer efficiency in order to expose the hydrocarbon+steam mixture to higher temperature and shorter contact time during pyrolysis, resulting in better selectivity for light olefin production. For example, increasing the heat transfer by increasing the tube's surface area that is exposed to the hydrocarbon feed is described in U.S. Pat. Nos. 6,419,885 and 6,719,953. Other methods for increasing the tube's heat transfer efficiency include the application of a mixing element (sometimes referred to as a "bead" or "fin") on the inner surface of the heat transfer tube. For example, U.S. Pat. No. 5,950,718 describes the use of a conventional 25 Cr/35Ni tube that includes a helical mixing element that is applied to the tube inner surface by plasma powder welding or arc welding. It has been observed that the flow of hydrocarbon+steam mixture through a radiant tube during pyrolysis results in the formation of a boundary layer adjacent to the radiant tube's inner surface. The boundary layer comprises hydrocarbon. The mixing element disturbs the boundary layer, leading to increased mixing between the boundary layer and the core flow of hydrocarbon+steam mixture. It is conventional to lessen the pressure-drop of the hydrocarbon+steam mixture traversing radiant tubes which contain one or more mixing elements. For example, U.S. Pat. No. 7,799,963 describes a structure which provides a decreased pressure drop as a result of discontinuities in the mixing elements. Both the tube and the discontinuous mixing elements are formed from conventional steam cracker alloys such as 25 Cr/20 Ni, 25 Cr/35 Ni, 35 Cr/45Ni, or Incolloy™.

Nevertheless, there remains a need for heat transfer tubes that suppress the formation of chromium-carbide phases while providing improved heat transfer through the incorporation of mixing elements.

SUMMARY OF THE INVENTION

The invention is based in part on the development of a new heat-transfer tube weldment. The weldments described herein comprise a tubular member and at least one mixing element comprising aluminum, the mixing element being located on the inner surface of the tubular member. The tubular member comprises at least one heat-resistant, aluminum-containing alloy which forms an alumina-containing scale on the tubular member's inner surface during hydrocarbon pyrolysis in the presence of steam. The mixing element also comprises at least one heat-resistant, aluminum-containing alloy, which forms an alumina-containing scale on the mixing element's surface during hydrocarbon pyrolysis in the presence of steam. The mixing element's heat-resistant, aluminum-containing alloy can be the same as or different from the tubular member's heat-resistant, aluminum-containing alloy. The tubular member is formed, e.g., by one or more of casting, forging, rolling, joining, machining, etc.

Accordingly, certain aspects of the invention relate to a weldment suitable for use a tube in a pyrolysis furnace, e.g., as a heat-transfer tube. The weldment comprises a first tubular member having inner and outer surfaces, and has at least one mixing element in surface contact with the tubular member's inner surface. The first tubular member includes at least one first steam cracker alloy which comprises aluminum. The mixing element comprises a second steam cracker alloy, which also comprises aluminum.

The first steam cracker alloy can comprise, e.g., an amount of aluminum $A_1$ in the range of from 2.0 wt. % to 10.0 wt. %, based on the weight of the first steam cracker alloy. The second steam cracker alloy can comprise, e.g., an amount of aluminum $A_2$ in the range of from 2.0 wt. % to 10.0 wt. %, based on the weight of the second steam cracker alloy, with the first and second steam cracker alloys having the same or different aluminum content, e.g., the concentration of aluminum in the second steam cracker alloy and the first steam cracker alloy can differ by at least 0.5 wt. %. In aspects where the first and second stream cracker alloys have different aluminum concentrations, the second steam cracker alloy typically has a greater aluminum content than that of the first steam cracker alloy, such as where the first steam cracker alloy comprises from 2.0 to 4.0 wt. % aluminum and the second steam cracker alloy comprises from 5.0 to 10.0 wt. % aluminum.

In other aspects, the invention relates to a hydrocarbon pyrolysis process, comprising passing hydrocarbon materials in admixture with steam under steam cracking conditions through at least one heat transfer tube, wherein the heat transfer tube comprises a weldment according to any of the preceding aspects.

It is observed that when using the weldment of any of the preceding aspects as a radiant tube during steam cracking pyrolysis mode, a protective, carburization-resistant layer forms over at least a portion of the first tubular member's inner surface and over at least a portion of the at least one mixing element (e.g., that portion of the mixing element's surface that is exposed to steam cracking). The carburization-resistant layer comprises alumina and can be substantially free of chromium. The heat-transfer tube weldment of the invention has surprisingly improved carburization resistance compared to conventional heat-transfer tubes, while providing improved mixing associated with the presence of one or more mixing elements.

The specified heat-transfer tube weldment, thereby, provides stable, durable surfaces to resist high temperature corrosion and coking in steam cracker furnace tubes, transfer line exchangers, and other components in steam cracker plants for transporting or conveying hydrocarbon-containing process streams, which may be prone to coking.

BRIEF DESCRIPTION OF THE DRAWING

The invention is further explained in the description that follows with reference to the drawing illustrating, by way of non-limiting example, various embodiments of the invention wherein: FIG. 1 illustrates a schematic flow diagram of a pyrolysis furnace.

DETAILED DESCRIPTION

Definitions

For the purpose of this description and appended claims, the following terms are defined. "Periodic Table" means the PERIODIC CHART OF THE ELEMENTS, The Merck Index, 12$^{th}$ Ed., Merck & Co., Inc., 1996.

"Steam cracker alloy" means any composition, solid solution, or solid mixture suitable for use as tubing in a steam cracking furnace for producing $C_{2+}$ unsaturated hydrocarbons. Such alloys show conductivity indicating metallic behavior and include at least 10 wt. % chromium and 15 wt. % nickel, based on the weight of the steam cracker alloy.

"Weldment" means a unit formed by connecting together two or more components, where the connection includes at least one weld. The term "weldment" encompasses units formed by plasma powder welding a mixing element to a tubular member, such as a heat transfer tube suitable for use in a steam cracker. Although all components of a weldment can be joined to the weldment by welding, this is not required.

"Heat transfer tube" includes but is not limited to any of the following members of a pyrolysis furnace: feed conduits; dilution steam conduits; steam cracker furnace tubes, such as convection tubes and/or radiant tubes, including those arranges in one or more coils; cross-over piping; transfer line exchangers; quench zone conduits; and other components in the pyrolysis process that may be exposed to a hydrocarbon+steam mixture at a temperature exceeding 500° C. The term "heat-transfer tube" also includes tubes providing heat-transfer functionality (among other functionalities, if any) in other processes for upgrading hydrocarbon, including those in which carburization may occur, such as conduits for transporting or conveying hydrocarbon process streams which may be prone to coking.

"Mixing element" means a protrusion from the inner surface of the tubular member provided the protrusion includes a contact angle formed between the inner surface of the tubular member and an edge of the protrusion, e.g., an incomplete coating on the inner surface, such as a bead weld formed from a steam cracker alloy. Since a mixing element is not a complete coating on the tubular member's internal surface, a boundary exists between (i) a region of the tubular member's interior surface which is not covered by a mixing element and (ii) a region of the tubular member's interior surface which is covered by a mixing element. The boundary typically includes a contact angle, with the contact angle's vertex typically located proximate to the mixing element's perimeter on the tubular member's inner surface. The extent of a contact angle (e.g., the angular range subtended) is determined macroscopically. Imperfect contact angles, as might be observed when an interfacial region proximate to a contact angle's vertex is viewed microscopically, are within the scope of the invention. A mixing element may be discrete (e.g., an island on the tubular member's interior surface) or continuous (e.g., a continuous weld bead along the tubular member's interior surface having a contact angle that is substantially constant along the length of the bead and substantially equal on either side of the bead). Particular mixing designs and configurations are described in U.S. Pat. Nos. 5,950,718, 6,419,885, 6,719,953, and 7,799,963, particularly those having a configuration as described in U.S. Pat. No. 7,799,963, the disclosure of each is incorporated herein in its entirety.

Unless otherwise indicated, all amounts, concentrations, and weight percentages recited herein are based on the total weight of the referenced composition, e.g., first steam cracker alloy, second steam cracker alloy, etc., as the case may be.

Various aspects will now be described in more detail with respect to weldments useful as heat-transfer tubes for conveying a hydrocarbon+steam mixture during steam cracking. The spirit and scope of the process and system disclosed herein is not limited to the selected aspects, and this description is not meant to foreclose other aspects within the broader scope of the invention, such as aspects which include the pyrolysis of hydrocarbon without steam. Moreover, one skilled in the art will appreciate that FIG. 1 is not depicted in any particular proportion or scale, and that many variations can be made to the illustrated aspects. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

Steam Cracking Furnace

Weldments of the invention are useful in steam cracking to produce light olefin, such as ethylene and/or propylene. An exemplary steam cracking furnace is depicted in FIG. 1. Steam cracking furnace 1 includes a radiant firebox 103, a convection section 104 and flue gas exhaust 105. Fuel gas is provided via conduit 100 and control valve 101 to burners 102 that provide radiant heat to a hydrocarbon feed to produce the desired pyrolysis products by thermal cracking of the feed. The burners generate hot gas that flows upward through the convection section 104 and then away from the furnace via conduit 105.

Hydrocarbon feed is conducted via conduit 10 and valve 12 to at least one convection coil 13. Hydrocarbon feed introduced into convection coil 13 is preheated by indirect contact with hot flue gas. Valve 12 is used to regulate the amount of hydrocarbon feed introduced into convection coil 13. Convection coil 13 is typically one of a plurality of convection coils that are arranged in a first coil bank for parallel flow of hydrocarbon feedstock. Typically, a plurality of feed conduits 10 and 11 convey hydrocarbon feed to each of the parallel convection coils of the first coil bank. Four feed conduits are represented in FIG. 1, but the invention is not limited to any particular number of feed conduits. For example, the invention is compatible with convection sections having 3, 4, 6, 8, 10, 12, 16, or 18 feed conduits for conveying in parallel portions of a total hydrocarbon feed to an equivalent number of convection coils located in the first coil bank. Although not shown, each of the plurality of feed conduits 11 may be provided with a valve (similar to valve 12). In other words, each of the plurality of conduits 11 can be in fluid communication with a convection coil (not shown) that (i) is located in the first coil bank and (ii) operates in parallel with convection coil 13. For simplicity, the description of the first convection coil bank will focus on convection coil 13. The other convection coils in the bank can be operated in a similar manner.

Dilution steam is provided via dilution steam conduit 20 through valve 22 to convection coil 23 for preheating by indirect transfer of heat from flue gas. Valve 22 is used to regulating the amount of dilution steam introduced into convection coil 23. Convection coil 23 is typically one of a plurality of convection coils that are arranged in a second coil bank for parallel dilution steam flow. Typically, a plurality of dilution steam conduits 20 and 21 convey dilution steam to each of the parallel convection coils of the second coil bank. Four dilution steam conduits are represented in FIG. 1, but the invention is not limited to any particular number of dilution steam conduits. For example, the invention is compatible with convection sections having 3, 4, 6, 8, 10, 12, 16, or 18 dilution steam conduits for conveying in parallel portions of an amount of total dilution steam to an equivalent number of convection coils located in the second convection coil bank. Although not shown, each of the plurality of dilution steam conduits 21 may be provided with a valve (similar to valve 22). In other words, each of the plurality of conduits 21 is in fluid communication with a convection coil (not shown) operating in parallel with convection coil 23. For simplicity, the description of the second convection coil bank will focus on coil 23. The other convection coils in the bank can be operated in a similar manner.

Preheated dilution steam and preheated hydrocarbon feed are combined in or proximate to conduit 25. The hydrocarbon+steam mixture is reintroduced into convection section 104 via conduit(s) 25, for preheating of the hydrocarbon+steam mixture in convection coil 30. Convection coil 30 is typically one of a plurality of convection coils that are arranged in a third coil bank for parallel flow of the hydrocarbon+steam mixture during pre-heating. One convection coil for pre-heating hydrocarbon+ steam mixture is represented in FIG. 1, but the invention is not limited to any particular number of such convection coils. For example, the invention is compatible with a third coil bank having 3, 4, 6, 8, 10, 12, 16, or 18 hydrocarbon+steam mixture convection coils for conveying in parallel portions of a total amount of hydrocarbon+steam mixture. For simplicity, the description of the third convection coil bank will focus on coil 30. The other convection coils in the bank operate in a similar manner. The hydrocarbon+steam mixture is typically pre-heated in convection coil 30 to, e.g., to a temperature in the range of from about 750° F. to about 1400° F. (400° C. to 760° C.).

Cross-over piping 31 is used for conveying preheated hydrocarbon+steam mixture to radiant coil 40 in radiant section 103 for thermal cracking of the hydrocarbon. Radiant coil 40 is typically one of a plurality of radiant coils (the others are not shown), which together constitute a bank of radiant coils in radiant section 103. The temperature of the heated mixture exiting conduit 30 is generally designed to be at or near the point where significant thermal cracking commences. Process conditions, such as the amount of feed pre-heating in convection coil 13, the amount of steam pre-heating in convection coil 23, the amount of hydrocarbon+steam mixture pre-heating in convection coil 30, the relative amount of hydrocarbon feed and dilution steam, the temperature, pressure, and residence time of the preheated hydrocarbon+steam mixture in radiant coil 40, and the duration of the first time interval (the duration of pyrolysis mode in coils 13, 23, 30, and 40) typically depend on the composition of the hydrocarbon feed, yields of desired products, and the amount of coke accumulation in the furnace (particularly in radiant coils) that can be tolerated. Thus, weldments as described herein are particularly useful as radiant coils 40. Although conventional hydrocarbon feeds and/or conventional process conditions used for the steam cracking, the weldments of the invention are not limited to use with particular feeds or process conditions, and this description is not meant to foreclose other feeds and/or process conditions within the broader scope of the invention.

After the desired degree of thermal cracking has been achieved in the radiant section 103, the furnace effluent is rapidly cooled in cooling stage 50. Any method of cooling the furnace effluent may be used. In one aspect, cooling stage 50 comprises at least a primary transfer line exchanger (TLE). For hydrocarbon feeds which comprise liquid hydrocarbon, e.g., heavier naphthas and all gas-oil feeds, a direct oil quench connection is often required downstream of the primary TLE. The oil quench connection allows addition of quench oil into the pyrolysis product stream to provide heat transfer from the product stream directly to the injected quench oil. For this purpose, a quench medium, such as quench oil, is injected into the effluent via at least one fitting adapted for this purpose. Additional quenching stages can be utilized in cooling stage 50, and these stages can be operated in series, parallel, or series-parallel. Cooled furnace effluent exits via conduit 51 for further separation and/or processing, e.g., for removing ethylene and/or propylene from the furnace effluent. Besides or in addition to their use in the steam cracking furnace, the specified weldments can be utilized in one or more TLE's or quench stages thus described. The invention is not limited with regard to methods of cooling the furnace effluent.

Hydrocarbon Feeds

Weldments described herein may be used for conveying substantially any hydrocarbon-containing feed that can produce light olefin by steam cracking. In certain aspects, the hydrocarbon comprises relatively high molecular weight hydrocarbons ("Heavy Feedstocks"), such as those which produce a relatively large amount of SCT during steam cracking. Examples of Heavy Feedstocks include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, wide boiling range naphtha to gas oil condensates, heavy non-virgin hydrocarbon streams from refineries, vacuum gas oils, heavy gas oil, naphtha contaminated with crude, atmospheric residue, heavy residue, $C_4$/residue admixture, naphtha/residue admixture, gas oil/residue admixture, and crude oil. The hydrocarbon can have a nominal final boiling point of at least about 600° F. (315° C.), generally greater than about 950° F. (510° C.), typically greater than about 1100° F. (590° C.), for example greater than about 1400° F. (760° C.). Nominal final boiling point means the temperature at which 99.5 wt. % of a particular sample has reached its boiling point.

In other aspects, the hydrocarbon comprises one or more relatively low molecular weight hydrocarbon (Light Feedstocks), particularly those aspects where relatively high yields of $C_2$ unsaturates (ethylene and acetylene) are desired. Light Feedstocks typically include substantially saturated hydrocarbon molecules having fewer than five carbon atoms, e.g., ethane, propane, and mixtures thereof. The weldments of the invention are particularly useful as heat transfer tubes for steam cracking Light Feedstock, and more particularly as radiant tubes for the steam cracking of ethane.

Weldments useful as heat-transfer tubes for conveying one or more of the foregoing feeds for steam cracking will now be described in more detail. The invention is not limited to weldments conveying these feeds, and this description is not meant to foreclose the use of such weldments for conveying other hydrocarbon-containing feeds within the broader scope of the invention.

Weldment

The weldment includes (i) a tubular member which comprises a first steam cracker alloy and having inner and outer surfaces and (ii) at least one mixing element in surface contact with the inner surface of the tubular member. The first and second steam cracker alloys are each selected from among those alloys that are capable of forming an alumina-containing protective coating (e.g., a scale) on the mixing element's surface during exposure of the mixing element's surface to hydrocarbon during steam cracking.

The weldment may be formed by securing the mixing element to the tubular member's inner surface by any suitable welding means, e.g., plasma power welding or argon/helium arc welding. Neither plasma powder welding nor argon/helium arc welding are coating technologies, e.g., thermal spraying, but instead are examples of welding overlay technology. In powder plasma welding, for example, metal powder is melted and welded by plasma torch on the inside surface of the base tube. A mixing element in the form of a continuous or discontinuous metal overlay on a portion of the tubular member's inner surface having a thickness of 1.0 to 3.0 mm, 1.5 to 2.5 mm, or 1.75 to 2.25 mm is strongly bonded by welding to provide a substantially pore-free overlay. The resulting weldment may be optionally post-annealed, tempered, laser melted or a combination thereof to increase the mixing elements mass density (and decrease its porosity).

In contrast, the conventional thermal spray coating processes such as plasma, HVOF and detonation gun generally yield a substantially continuous coating of a metal layer over the entire inner surface of the tubular member. Such a coating has greater porosity than that resulting from the mixing elements of the invention, such as those produced by plasma powder welding a discontinuous bead of the specified second steam cracker alloy on the tubular member's inner surface. The conventional thermal spray coating is produced by a process in which molten or softened particles are applied by impact onto a substrate. While not wishing to be bound by any theory or model, it is believed that such conventional coatings contain reticular or lamellar grain structure resulting from the rapid solidification of small globules, flattened from striking a cold surface at high velocities. It is difficult to ensure that all particles are the exact same size and achieve the same temperature and velocity. Thus, variations in the conditions of the individual particles on impact during thermal spray process lead to heterogeneous structure, which includes excessive porosity.

Mixing elements of the invention may be configured in any convenient manner according to the design of the tube. For example, the mixing element should be configured to agitate a flow hydrocarbon material passing through the weldment to distribute the flow of hydrocarbon material across a transverse cross section of tube to create a generally uniform temperature profile across an entire transverse cross section of the passage. This is typically accomplished by utilizing a tubular member having an internal circular cross-sectional area that is substantially open to fluid flow through the tube, with the mixing element protruding from at least one region on the inner surface of the tubular member. When the weldment comprises a plurality of mixing elements, all of the mixing elements optionally have the substantially the same composition and optionally all are of the same size and shape. For example, the plurality of mixing elements can be in the form of fins projecting in a direction substantially intersecting a longitudinal axis of the tubular member and operable to deflect a flow of hydrocarbon material in the tube. When the weldment is used as a radiant tube, this arrangement increases the uniformity of the temperature profile of the flow of hydrocarbon+steam mixture in relation to a transverse cross section of tube. The mixing element may comprise a plurality discretely formed protrusions or a continuous protrusion along the inner surface of the tubular member. The protrusions, whether discontinuous or continuous, may be arranged in one or more generally helical designs along the inner surface. Methods for securing mixing elements to tubular member surfaces as well as the configuration of mixing elements are described in U.S. Pat. Nos. 5,950,718 and 7,799,963, any of which may be used in the weldments described herein.

First Tubular Member

The weldment typically comprises a first tubular member, the first tubular member having (i) inner and outer surfaces and (ii) at least one internal channel defined by the tubular member's inner surface, the channel being open for fluid flow into, through, and out of the tubular member. The first steam cracker alloy may have any composition provided (i) it has performance characteristics (such as heat-transfer, ductility, and strength characteristics) that render it suitable for use in a steam cracking furnace and (ii) is capable of forming an alumina-containing protective coating (e.g., a scale) on the tubular member's internal surface during steam cracking. Some such alloys are described in Table 1 of U.S. Pat. No. 8,431,230, assigned to Kubota Corporation, the patent being incorporated by reference herein in its entirety. Certain examples of the first steam cracker alloy comprise aluminum, nickel, chromium, iron and carbon; and optionally in addition to these one or more of, silicon, manganese, tungsten, molybdenum, titanium, zirconium, niobium, boron, and one or more rare earths.

The first steam cracker alloy purposely includes aluminum, typically at a level ≥ about 2.0 wt. %, e.g., ≥ about 2.5 wt. %, such as ≥ about 3.0 wt. %, or ≥ about 3.5 wt. %, or ≥ about 4.0 wt. %, or ≥ about 4.5 wt. %, or ≥ about 5.5 wt. %, or ≥ about 6.0 wt. %, or ≥ about 6.5 wt. %, or ≥ about 7.0 wt. %, or ≥ about 8.0 wt. %, or ≥ about 9.0 wt. %, or ≥ about 9.5 wt. %, or ≥ about 10.0 wt. % aluminum. Additionally or alternatively, the concentration of aluminum in the first steam cracker alloy may be ≤ about 10.0 wt. %, e.g., ≤ about 9.5 wt. %, or ≤ about 9.0 wt. %, or ≤ about 8.0 wt. %, or ≤ about 7.0 wt. %, or ≤ about 6.5 wt. %, or ≤ about 6.0 wt. %, or ≤ about 5.5 wt. %, or ≤ about 4.5 wt. %, or ≤ about 4.0 wt. %, or ≤ about 3.5 wt. %, ≤ about 3.0 wt. %, or ≤ about 2.5 wt. %, or about 2.0 wt. %. Ranges of the aluminum content in the first steam cracker alloy that are expressly disclosed include combinations of any of the above-enumerated values, e.g., about 2.0 to about 10.0 wt. % aluminum, or about 2.0 to about 8.0 wt. %, or about 2.0 to about 7.0 wt. %, or about 2.0 to about 6.0 wt. %, or about 2.0 to about 4.0 wt. %, or about 2.5 to about 4.0 wt. %, or about 3.0 to about 4.0 wt. %, or about 3.5 to about 4.0 wt. % aluminum etc. At least about 2.0 wt. % aluminum is preferred where formation of sufficient quantity of the carburization-resistant layer on the inner tube surface is desired. High concentrations of aluminum e.g., in the first steam cracker alloy, e.g., ≥ about 4 wt. %, may lead to a degradation in certain properties of the first tubular member, such as a decrease in ductility, which can lead to a decrease in performance of the weldment in steam cracking service. It has been found that this difficulty can be overcome with the weldments of the invention by including in the weldment a second tubular member that is generally coaxial with the first tubular member, with the outer surface of the first tubular member typically being proximate to the inner surface of the second tubular member. The second tubular member typically comprises at least one alloy having improved mechanical properties, e.g., improved ductility, creep, and/or rupture strength, compared to the first steam cracker alloy.

In addition to aluminum, the first steam cracker alloy typically comprises chromium and/or nickel. For example, the first steam cracker alloy can comprise ≥ about 15.0 wt. % chromium, e.g., ≥ about 17.5 wt. %, or ≥ about 18.0 wt. %, or ≥ about 20.0 wt. %, or ≥ about 22.0 wt. %, or ≥ about 24.0 wt. %, or ≥ about 30.0 wt. %, or ≥ about 35.0 wt. %, or ≥ about 40.0 wt. % chromium. Additionally or alternatively, the steam cracker alloy may comprise chromium in an amount of ≤ about 50.0 wt. %, e.g., ≤ about 45.0 wt. %, or ≤ about 40.0 wt. %, or ≤ about 35.0 wt. %, or ≤ about 30.0 wt. %, or ≤ about 25.0 wt. %, or ≤ about 22.0 wt. %, or ≤ about 18.0 wt. %, or ≤ about 16.0 wt. %. Ranges of the chromium content in the first steam cracker alloy that are expressly disclosed include combinations of any of the above-enumerated values, e.g., about 15.0 to about 50.0 wt. %, or about 16 to about 30.0 wt. %, or about 20.0 to about 30.0 wt. %, or about 22.0 to about 30.0 wt. %, or about 24.0 to about 35.0 wt. %, etc. When the concentration if chromium is at least 15.0 wt. % the integrity of the weldment is substantially maintained in the presence of the carburization layer. Those skilled in the art will appreciate that the amount of chromium should not be so large as to result in a decrease in the alloy's high temperature mechanical properties, such as a decrease in high-temperature creep resistance and/or high-temperature rupture strength.

The amount of nickel in the first steam cracker alloy may be ≥ about 18.0 wt. % nickel, e.g., ≥ about 20.0, such as ≥ about 25.0 wt. %, or ≥ about 30.0 wt. %, or ≥ about 35.0 wt. %, or ≥ about 40.0 wt. %, or ≥ about 45.0 wt. %, or ≥ about 50.0 wt. %, or ≥ about 55.0 wt. %, or ≥ about 65.0 wt. % nickel. Additionally or alternatively, the amount of nickel in the steam cracker alloy may be ≤ about 70.0 wt. %, e.g., ≤ about 65.0 wt. %, or ≤ about 55.0 wt. %, or ≤ about 50.0 wt. %, or ≤ about 45.0 wt. %, or ≤ about 40.0 wt. %, or ≤ about 35.0 wt. %, or ≤ about 30.0 wt. %, or ≤ about 20.0 wt. % or ≤ about 25.0 wt. % nickel. Ranges of the nickel content in the first steam cracker alloy that are expressly disclosed include combinations of any of the above-enumerated values, e.g., about 18.0 to about 70.0 wt. %, or about 25.0 to about 45.0 wt. %, or about 30.0 to about 55.0 wt. %, or about 35.0 to about 55.0 wt. %, or about 40.0 to about 55.0 wt. %, or about 45.0 to about 55.0 wt. %, or about 50.0 to about 55.0 wt. %, etc. Nickel is believed to provide the steam cracker alloy with oxidation resistance, e.g., during decoking mode. Although a lower concentrations of nickel can be compensated by an increased iron content, those skilled in the art will appreciate that sufficient nickel should be included in the alloy to prevent the formation of oxides, e.g., chromium oxides, iron oxides, and/or manganese oxides, that inhibit the formation of the desired carburization-resistant layer.

The amount of iron in the first steam cracker alloy may be ≤ about 65.0 wt. %, e.g., ≤ about 65.0 wt. %, or ≤ about 55.0 wt. %, or ≤ about 45.0 wt. %, or ≤ about 35.0 wt. %, or ≤ about 25.0 wt. %, or ≤ about 15.0 wt. %, or ≤ about 5.0 wt. %. Additionally or alternatively, the first steam cracker alloy may comprise iron in an amount of ≥0 wt. %, e.g., ≥ about 0.10 wt. %, such as ≥ about 5.0 wt. %, or ≥ about 15.0 wt. %, or ≥ about 25.0 wt. %, or ≥ about 35.0 wt. %, or ≥ about 45.0 wt. %, or ≥ about 55.0 wt. % iron. Ranges of the iron content in the first steam cracker alloy that are expressly disclosed include combinations of any of the above-enumerated values, e.g., about 0 to about 65.0 wt. % iron, or about 1.0 to about 65.0 wt. %, or about 5.0 to about 65.0 wt. %, or about 15.0 to about 65.0 wt. %, or about 35.0 to about 55.0 wt. %, or about 40.0 to about 55.0 wt. %, or about 45.0 to about 55.0 wt. %, or about 50.0 to about 55.0 wt. % iron, etc.

Carbon may be present in the first steam cracker alloy in an amount ≥0.05 wt. %, e.g., ≥ about 0.1 wt. %, such as ≥ about 0.2 wt. %, or ≥ about 0.3 wt. %, or ≥ about 0.4 wt. %, or ≥ about 0.5 wt. %, or ≥ about 0.6 wt. % carbon. Additionally or alternatively, carbon may be present in an amount ≤ about 0.7% wt. %, e.g., ≤ about 0.6% wt. %, or ≤ about 0.5% wt. %, or ≤ about 0.4% wt. %, or ≤ about 0.3% wt. %, or ≤ about 0.2% wt. %, or ≤ about 0.1% wt. % carbon. Ranges of the carbon content in the first steam cracker alloy that are expressly disclosed include combinations of any of the above-enumerated values, e.g., about 0.05 to about 0.7 wt. % carbon, or about 0.05 to about 0.6 wt. %, or about 0.05 to about 0.5 wt. %, or about 0.05 to about 0.4 wt. %, or about 0.05 to about 0.3 wt. %, or about 0.05 to about 0.2 wt. %, or about 0.05 to about 0.1 wt. %, or about 0.3.0 to about 0.5 wt. % carbon, etc. Carbon is believed to enhance the first tubular member's castability and high-temperature mechanical properties, such as creep resistance and rupture strength. Those skilled in the art will appreciate that the amount of carbon should not be so large as to result in (i) the formation of coke or other distinct carbonaceous phases and/or (ii) a decrease in the alloy's ductility and/or toughness.

When silicon is present in the first steam cracker alloy it may be present at a concentration of ≤ about 2.5 wt. % silicon, e.g., ≤ about 2.0 wt. %, or ≤ about 1.5 wt. %, or ≤ about 1.0 wt %, or ≤ about 0.5 wt. %, or ≤ about 0.1 wt. % silicon. Additionally or alternatively, the silicon concentration in the first steam cracker alloy may be ≥0 wt. %, e.g., ≥ about 0.1 wt. %, such as ≥ about 0.2 wt. %, or ≥ about 0.3 wt. %, or ≥ about 0.4 wt. % silicon. Ranges of the silicon content in the first steam cracker alloy that are expressly disclosed include combinations of any of the above-enumerated values, e.g., 0 to about 2.5 wt. % silicon, 0 to about 2.0 wt. %, 0 to about 1.5 wt. %, 0 to about 1.0 wt. %, 0 to about 0.5 wt. %, 0 to about 0.1 wt. % silicon, etc. Silicon is believed to serve as a deoxidizer and give higher flowability to the alloy in the molten state. Those skilled in the art will appreciate that the amount of silicon should not be so large as to result in a decrease in the alloy's high temperature mechanical properties, such as a decrease in high-temperature creep resistance and/or high-temperature rupture strength.

Manganese may be present in the first steam cracker alloy, e.g., to serve as an oxygen and/or sulfur scavenger when the alloy is in the molten state. When such scavenging functionality is desired, manganese is generally present at a concentration of ≤ about 3.0 wt. %, e.g., ≤ about 2.5 wt. %, or ≤ about 2.0 wt. %, or ≤ about 1.5 wt. %, or ≤ about 1.0 wt. %, or ≤ about 0.5 wt. %, or ≤ about 0.1 wt. %, or about 0 wt. % manganese. Ranges of the manganese content in the first steam cracker alloy that are expressly disclosed include combinations of any of the above-enumerated values, e.g., 0 to about 3.0 wt. % manganese, 0 to about 2.5 wt. %, 0 to about 2.0 wt. %, 1.0 to about 2.0 wt. %, 1.5 to 2.5 wt. % manganese, etc.

Tungsten and/or molybdenum may also be present in the first steam cracker alloy in an amount of 0.1 to about 10.0 wt. %, e.g., 0.5 to 10.0 wt. %, 1.0 to 5 wt. %, particularly 0.5 to 10 wt. % tungsten, 1 to 8 wt. % tungsten, and/or 0.1 to 5.0 wt. % molybdenum, 0.5 to 3 wt. % molybdenum. It is believed that molybdenum and tungsten enhance the alloy's high-temperature mechanical properties, such as creep resistance and rupture strength. When both elements are present the combined concentration generally should not exceed 10 wt. %.

Optionally, the first steam cracker alloy includes one or more of titanium, zirconium, and niobium. When used, the total concentration of these elements is generally ≥ about 0.1 wt. %, e.g., about 0.1 to about 1.8 wt. %, or about 0.1 to about 1.5 wt. %, or about 0.1 to about 1.0 wt. %, or about 0.1 to about 0.6 wt. %. Particularly, titanium and or zirconium may be present in an amount of about 0.1 to about 0.6 wt. %. Niobium may be present in an amount of about 0.1-1.8%.

Boron may be present in the first steam cracker alloy and improve grain boundary performance. Generally boron may be present in an amount of 0 to about 0.1% wt. %, e.g., 0 to 0.07 wt. %, 0 to about 0.5 wt. %, or 0.05 to about 0.1 wt. %.

The first steam cracker alloy may also include one or more rare-earth elements, i.e., 15 elements of the lanthanide series ranging from lanthanum to lutetium in the Periodic Table, and yttrium and scandium, particularly cerium, lanthanum and neodymium, in an amount of about 0.005 to about 0.4 wt. %. As for the rare-earth elements to be incorporated into the present alloy, cerium, lanthanum and neodymium may form, in a combined amount, at least about 80%, more preferably at least about 90%, of the total amount of the rare-earth elements. The presence of rare earth elements is believed to contribute to the formation and stabilization of the carburization-resistant layer.

First steam cracker alloys containing phosphorous, sulfur, and other impurities, such as those inevitably incorporated into the alloy when the material is prepared, are within the scope of the invention. Those skilled in the art will appreciate that the amount of these impurities should not be so large as to exceed the amounts that are typical in conventional steam cracker alloys.

In certain aspects, the first tubular member comprises more than one of the foregoing first steam cracker alloys. Combinations and permutations of any of the specified first steam cracker alloy compositions are expressly within the scope of the invention. Suitable first steam cracker alloys include those disclosed in U.S. Pat. Nos. 6,409,847 and 7,963,318, which are incorporated by reference herein in their entireties. In particular aspects, the first steam cracker alloy comprises ≤65.0 wt. % iron, ≥18.0 wt. % chromium, and ≥25.0 wt. % nickel, e.g., ≥ about 20.0 wt. % chromium, and iron. Iron is typically, although not necessarily, present at a concentration of ≥ about 25.0 wt. %. First steam cracker alloys can be selected e.g., from those Kubota alloys available under the tradename Aftalloy™, and from those Schmidt and Clemens GmbH & Co, alloys available under the tradename Centralloy™ HTE.

The first steam cracker alloy may be formed into the tubular member by any suitable means, e.g., by one or more of casting, forging, rolling, joining, machining, etc. Conventional forming methods can be used, such as centrifugal casting, but the invention in not limited thereto. Exemplary centrifugal casting apparatus and methods are described in U.S. Pat. No. 5,223,278, incorporated herein by reference in its entirety. The invention, however, is not limited thereby.

Mixing Element(s)

In addition to the first tubular member, the weldments herein include at least one mixing element in surface contact with the inner surface of the tubular member. Mixing elements serve to agitate the flow of hydrocarbon material (i.e., steam-cracker feed, steam-cracked products, etc.) conveyed through the weldment's interior passage(s). When a plurality of the mixing elements is present in the weldment, each of the mixing elements can be of the same composition, but this is not required. At least one mixing element comprises a second steam cracker alloy having a concentration of aluminum typically ≥ about 2.0 wt. %, e.g., ≥ about 2.5 wt. %, or ≥ about 3.0 wt. %, or ≥ about 3.5 wt. %, or ≥ about 4.0 wt. %, or ≥ about 4.5 wt. %, or ≥ about 5.0 wt. %, or ≥ about 5.5 wt. %, or ≥ about 6.0 wt. %, or ≥ about 6.5 wt. %, or ≥ about 7.0 wt. %, or ≥ about 8.0 wt. %, or ≥ about 9.0 wt. %, or ≥ about 9.5 wt. %, or about 10.0 wt. % aluminum. Additionally or alternatively, the concentration of aluminum may be ≤ about 10.0 wt. %, e.g., ≤ about 9.0 wt. %, or ≤ about 8.0 wt. %, or ≤ about 7.0 wt. %, or ≤ about 6.5 wt. %, or ≤ about 6.0 wt. %, or ≤ about 5.5 wt. %, or ≤ about 5.0 wt. %, or ≤ about 4.0 wt. %, or ≤ about 3.0 wt. %. Ranges of the aluminum content in the second steam cracker alloy that are expressly disclosed include combinations of any of the above-enumerated values, e.g., about 5.0 to about 10.0 wt. % aluminum, or about 6.0 to about 10.0 wt. %, or about 7.0 to about 10.0 wt. %, or about 5.0 to about 9.0 wt. %, or about 5.5 to about 8.0 wt. %, or about 6.0 to about 8.0 wt. %, or about 5.0 to about 8.0 wt. %, or about 6.0 to about 6.5 wt. % aluminum. It has been observed that the mixing element can be prone to cracking during weldment manufacturing, particularly during solidification of the mixing element on the first tubular member's interior surface during and after welding. It has been found that this difficulty can be overcome when the second steam cracker alloy includes iron and/or silicon, particularly when the second steam cracker alloy includes silicon and iron, such as 0.05 wt. % to 5.0 wt. % silicon and 35.0 wt. % to 65.0 wt. % iron.

Surprisingly, it has been found that the aluminum-containing steam cracker alloys used to form the mixing element form a sufficient metallurgical bond to the inner surface of the tubular member over a broad compositional range, particularly over a broad range of aluminum content in the second steam cracker alloy. It was expected that a substantially uniform coating of the second steam cracker alloy would be needed on the inner surface of the tubular member to prevent coating delamination. Those skilled in the art will appreciate that, e.g., imbalances in cohesive and adhesive forces, introduce significant complexities when metallurgically bonding one aluminum-containing alloy to another aluminum-containing alloy. Moreover, dissimilar alloys in contact at an interface, e.g., an aluminum-containing alloy in contact with a second alloy containing aluminum but in a lesser amount, generally exhibit incompatibilities which can limit the ability of the first alloy (e.g., a surface alloy) to "wet" the second alloy (e.g., a substrate alloy). This effect generally manifests itself as an increase in contact angle (also called an internal contact angle increase), e.g., to a value ≥90° at the perimeter of the surface layer. The increase in internal contact angle arises from the balance of internal energy densities when the surface layer is applied as a liquid to the substrate, and the surface layer is then solidified. A surface alloy is "wetting" when the contact angle is less than 90°, and non-wetting when the contact angle is greater than or equal to 90°. Generally, increasing compositional dissimilarities between the surface and substrate alloys leads to a decrease in wetting and an increased tendency toward coating delamination. In other words, there is a greater tendency toward coating delamination as contact angle increases. The tendency toward delamination can be lessened, even for a non-wetting alloy surface solidified on a substrate of a dissimilar alloy, when the surface alloy is in the form of a substantially-uniform coating on a substantially-continuous internal surface of the substrate. An example of this is a substantially-uniform coating on the internal surface of a tube. In such cases, there is no contact angle because the surface alloy-substrate alloy surface tension is symmetrically distributed (e.g., balanced) over the entire internal surface of the tubular substrate. Surprisingly, it has been found that aluminum-containing alloys possess satisfactory metallurgical bonding to a variety of alloys with a variety of steam-cracker alloys without the need for the mixing element being a substantially-continuous coating on the inner surface of the tubular member. The aluminum-containing alloy used in the mixing element surprisingly adheres to the underlying alloys despite the absence of the substantially uniform surface forces which serve to prevent coating delamination. It is even more surprising that sufficient metallurgical bonding occurs between tubular members alloy comprising aluminum and mixing elements formed from an alloy having a different aluminum concentration from the tubular member, particularly where the aluminum concentration of the alloy from which the mixing element is formed has a greater concentration of aluminum than the alloy from which the tubular member is formed.

Accordingly, in certain aspects the amounts of aluminum in the first ($A_1$) and second ($A_2$) steam cracker alloys may be essentially equal. In other aspects, the concentrations of aluminum in the second steam cracker alloy and the first steam cracker alloy may differ by ≥ about 1.0 wt. %, e.g., ≥ about 2.0 wt. %, or ≥ about 3.0 wt. %, or ≥ about 4.0 wt. %, or ≥ about 5.0 wt. %, or ≥ about 6.0 wt. %, or ≥ about 7.0 wt. %. In particular aspects, the aluminum concentration of the second steam cracker alloy differs from that of the first steam cracker alloy by about 1.0 to about 5.0 wt. %, or about 1.0 to about 4.0 wt. %, or about 1.0 to about 3.5 wt. %, or about 1.0 to about 3.0 wt. %, or about 1.0 to about 2.5 wt. %, or about 1.0 to about 2.0 wt. %, or about 1.0 to about 1.5 wt. %. While any first and second steam cracker alloys meeting these conditions may be used, the second steam cracker alloy typically has a higher concentration of aluminum than does the first steam cracker alloy. It is observed that adherence of the mixing element to the internal surface of the tubular member is achieved, particularly for a weldment utilized as a radiant tube operating under steam cracking conditions, even when the aluminum content of the second steam cracker alloy is greater than that of the first steam cracker alloy, i.e., $A_2 \geq A_1$, such as when $A_2$ minus $A_1$ is ≥0.5 wt. %, or $A_2$ minus $A_1$ is ≥1.0 wt. %. Even when $A_2 \geq A_1$, mixing element cracking during solidification of the mixing element on the first tubular member's interior surface during welding can be lessened or eliminated by including iron and/or silicon in the second steam cracker alloy, e.g., silicon and iron, such as 0.05 wt. % to 5.0 wt. % silicon and 35.0 wt. % to 65.0 wt. % iron.

While any second steam cracker alloy having an aluminum concentration described above may be used, exemplary second steam cracker alloy compositions will now be described in more detail, including second steam cracker alloys which in addition to the specified range of aluminum content optionally further comprise one or more of chromium, nickel, iron, carbon, manganese, titanium, zirconium, hafnium, vanadium, niobium, tantalum, molybdenum, tungsten, gallium, germanium, arsenic, indium, tin, antimony, lead, palladium, platinum, copper, silver, gold, scandium, lanthanum, yttrium, and cerium.

The second steam cracker alloy can further comprise chromium, e.g., ≥ about 15.0 wt. % chromium, such as ≥ about 18.0 wt. %, or ≥ about 20.0 wt. %, or ≥ about 22.0 wt. %, or ≥ about 25.0 wt. %, or ≥ about 30.0 wt. %. Additionally or alternatively, the second steam cracker alloy may comprise chromium in an amount of ≤ about 30.0 wt. %, e.g., ≤ about 25.0 wt. %, or ≤ about 24.0 wt. %, or ≤ about 22.5 wt. %, or ≤ about 20.0 wt. %, or ≤ about 18.0 wt. %. Ranges of the chromium content in the second steam cracker alloy that are expressly disclosed include combinations of any of the above-enumerated values, e.g., about 15.0 to about 30.0 wt. % chromium, or about 18 to about 30.0 wt. %, or about 20.0 to about 30.0 wt. %, or about 22.0 to about 30.0 wt. %, or about 25.0 to about 30.0 wt. %, 18.0 to 25.0 wt. %, or 19.0 to 24.0 wt. %, or 20.0 to 22.5 wt. % chromium, etc.

The second steam cracker alloys can further comprise nickel, e.g., ≥ about 20.0 wt. % nickel, such as ≥ about 25.0 wt. %, or ≥ about 30.0 wt. %, or ≥ about 35.0 wt. %, or ≥ about 40.0 wt. % nickel. Additionally or alternatively, the amount of nickel in exemplary second steam cracker alloy may be ≤ about 45.0 wt. %, e.g., ≤ about 40.0 wt. %, or ≤ about 35.0 wt. %, or ≤ about 30.0 wt. %, or ≤ about 25.0 wt %. Ranges of the nickel content in the second steam cracker alloy that are expressly disclosed include combinations of any of the above-enumerated values, e.g., about 20.0 to about 45.0 wt. %, or about 25.0 to about 45.0 wt. %, or about 30.0 to about 45.0 wt. %, or about 35.0 to about 45.0 wt. %, or about 40.0 to about 45.0 wt. %, etc. The amount of nickel in the second steam cracker alloy can depend on the amounts of other components, e.g., on the amounts of aluminum, chromium, and iron in the second steam cracker alloy. For example, when the second steam cracker alloy comprises aluminum, chromium, and iron, then ≥90.0 wt. % of the balance of the second steam cracker alloy can comprise, consist essentially of, or even consist of nickel. Typically, ≥95.0 wt. % of the balance is nickel, e.g., ≥99.0 wt. %, such as ≥99.9 wt. %. The invention encompasses second steam cracker alloys where substantially all of the balance is nickel. In particular aspects, the second steam cracker alloy includes 5.0 wt. % to 10.0 wt. % aluminum, 18.0 wt. % to 25.0 wt. % chromium, ≤0.5 wt. % Si, and ≥35.0 wt. % iron, with the balance of the second steam cracker alloy (to achieve 100 wt. %) comprising, consisting essentially of, or even consisting of nickel. In these aspects, the amount of nickel can be, e.g., in the range of from about 25.0 wt. % to about 40.0 wt. %.

The second steam cracker alloys can further comprise iron, e.g., ≥ about 35.0 wt. % iron, such as ≥ about 40.0 wt. %, or ≥ about 45.0 wt. %, or ≥ about 50.0 wt. %, or ≥ about 55.0 wt. % iron. Additionally or alternatively, the second steam cracker alloy may comprise ≤ about 55.0 wt. %, e.g., ≤ about 50.0 wt. %, or ≤ about 45.0 wt. %, or ≤ about 45.0 wt. % iron. Ranges of the iron content in the second steam cracker alloy that are expressly disclosed include combinations of any of the above-enumerated values, e.g., about 35.0 to about 55.0 wt. %, or about 40.0 to about 55.0 wt. %, or about 45.0 to about 55.0 wt. %, or about 50.0 to about 55.0 wt. %, or about 35.0 to about 40 wt. % iron, etc.

The second steam cracker alloy can further comprise silicon, e.g., ≤0.50 wt. % silicon, such as ≤ about 0.45 wt. %, or ≤ about 0.40 wt. %, or ≤ about 0.35 wt. %, or ≤ about 0.30 wt. %, or ≤ about 0.25 wt. %, or ≤ about 0.20 wt. %, or ≤ about 0.10 wt. %, or about 0 wt. %. Additionally or alternatively, silicon may be present in an amount ≥ about 0 wt. %, e.g., ≥ about 0.10 wt. %, ≥ about 0.20 wt. %, or ≥ about 0.25 wt. %, or ≥ about 0.30 wt. %, or ≥ about 0.35 wt. %, or ≥ about 0.40 wt. %, or ≥ about 0.45 wt. %. Exemplary ranges of the silicon content in the second steam cracker alloy expressly disclosed include combinations of any of the above-enumerated values, e.g., about 0 to about 0.50 wt. % silicon, or about 0.10 to about 0.45 wt. %, or about 0.20 to about 0.40 wt. %, or about 0.25 to about 0.35 wt. % silicon, etc.

Carbon can be present in the second steam cracker alloy. For example, carbon may be present in an amount ≥ about 0 wt. %, e.g., ≥ about 0.02 wt. %, such as ≥ about 0.05 wt. %, or ≥ about 0.07 wt. %, or ≥ about 0.09 wt. %. When the second steam cracker alloy includes carbon, the amount of carbon is typically ≤ about 0.1 wt. % carbon, e.g., ≤0.08 wt. %, or ≤ about 0.05 wt. % carbon. Exemplary ranges of the carbon content in the second steam cracker alloy expressly disclosed include combinations of any of the above-enumerated values, e.g., 0 to about 0.10 wt. % carbon, or about 0.02 to about 0.08 wt. %, or about 0.05 to about 0.08 wt. %, or about 0.09 to about 0.10 wt. % carbon, etc. Carbon may be present in the second steam cracker alloy as a form of carbide precipitates, which are believed to contribute to improved creep strength when it is exposed to high temperatures for extended periods of time.

The second steam cracker alloy may further include 0.01 to 4.0 wt. %, e.g., 0.03 to about 3.7 wt. %, or about 0.05 to about 3.5 wt. %, or about 0.07 to about 3.3 wt. %, or about 1.0 to about 3.0 wt. %, or about 1.3 to about 2.7 wt. %, or about 1.5 to about 2.5 wt. %, or about 1.7 to about 2.3, or about 2.0 wt. %, of at least one element chosen from manganese, titanium, zirconium, hafnium, vanadium, niobium, tantalum, molybdenum, tungsten, and combinations thereof. The total amount of this group of elements in the second steam cracker alloy is generally ≤ about 4.0 wt. %, e.g. ≤ about 2.0 wt. %, or ≤ about 1.0 wt. %, or about 0 wt. %.

Alloying elements, such as for example, gallium, germanium, arsenic, indium, tin, antimony, lead, palladium, platinum, copper, silver and gold, are believed to inhibit coking formation because these elements are non-catalytic to surface carbon transfer reaction. Alloying elements, such as for example, rhenium, ruthenium, rhodium, iridium, palladium, platinum, copper, silver and gold, may provide increased coating integrity, stability and durability and/or lower the defect concentration in the second steam cracker alloy. Thus, the second steam cracker alloy may include about 0.10 to about 2.0 wt. %, e.g., about 0.5 to about 1.5 wt. %, or about 0.75 to about 1.25 wt. %, or about 1.00 wt. % of at least one element selected gallium, germanium, arsenic, indium, tin, antimony, lead, palladium, platinum, copper, silver and gold and combinations thereof. The total amount of this group of elements in the second steam cracker alloy is generally ≤ about 3.0 wt. %, e.g. ≤ about 2.0 wt. %, or ≤ about 1.0 wt. %, or about 0 wt. %. Additionally or alternatively, the second steam cracker alloy may include 0.1 wt. % to 2.0 wt. %, e.g., about 0.5 to about 1.5 wt. %, or about 0.75 to about 1.25 wt. %, or about 1 wt. % of at least one element chosen from rhenium, ruthenium, rhodium, iridium, palladium, platinum, copper, silver and gold. The total amount of this group of elements in the second steam cracker alloy is generally ≤ about 3.0 wt. %, e.g. ≤ about 2.0 wt. %, or ≤ about 1.0 wt. %, or about 0 wt. %.

The second steam cracker alloy may further include at least one element chosen from scandium, lanthanum, yttrium, and cerium in an amount ≥ about 0.10 wt. %, e.g., ≥ about 0.30 wt. %, such as ≥ about 0.50 wt. %, or ≥ about 0.70 wt. %, or ≥ about 1.0 wt. %, or ≥ about 1.30 wt. %, or ≥ about 1.50 wt. %, or ≥ about 1.70 wt. %. Additionally or alternatively, at least one of scandium, lanthanum, yttrium, and cerium may be present in an amount≤ about 2.0 wt. %, e.g., ≤ about 1.70 wt. %, or ≤ about 1.50 wt. %, or ≤ about 1.30 wt. %, or ≤ about 1.00 wt. %, or ≤ about 0.70 wt. %, or ≤ about 0.50 wt. %, or ≤ about 0.30 wt. %. Exemplary content ranges in the second steam cracker alloy expressly disclosed include combinations of any of the above-enumerated values, e.g., about 0.01 wt. % to about 2.0 wt. %, or about 0.03 wt. % to about 1.7 wt. %, or about 0.05 wt. % to about 1.5 wt. %, or about 0.07 wt. % to about 1.3 wt. %, or about 1.0 wt. %. The total amount of this group of elements in the second steam cracker alloy is generally ≤ about 3.0 wt. %, e.g. ≤ about 2.0 wt. %, or ≤ about 1.0 wt. %.

Any of the above enumerated elements may be present in the second steam cracker alloy in the form of intermetallic precipitates including, but not limited to, $Ni_3Al$, NiAl, etc. in an amount of 0.1 wt. % to 30.0 wt. %. Likewise, the second steam cracker alloy may include any of the above elements in the form of an oxide, carbide, nitride and/or carbonitride in an amount of e.g., 0.01 wt. % to 5.0 wt. %. These intermetallic precipitates and inclusions are formed particularly from the constituting elements of the second steam cracker alloy including, but not limited to, iron, nickel, chromium, aluminum and silicon. Both intermetallic precipitates and oxide, carbide, nitride and carbonitride inclusions may provide improved high temperature creep strength.

The second steam cracker alloy typically has a low porosity, which contributes to its improved resistance to corrosion and coking when exposed to hydrocarbon streams in petrochemical and refining process units. The second steam cracker alloy has e.g., ≤2.0 vol. % porosity, or ≤1.0 vol. % porosity, or ≤0.5 vol. % porosity, or ≤0.1 vol. % porosity. Excessive porosity in the second steam cracker alloy, if present, would serve as a pathway for gaseous molecules of hydrocarbon streams in petrochemical and refining process units to undesirably transfer gaseous molecules. The transfer of gaseous molecules may contribute to corrosion deterioration of mechanical strength. Thus, it is advantageous to achieve a second steam cracker alloy including a minimal amount of porosity.

Particular aspects of the second steam cracker alloy will now be described in more detail. The invention is not limited to these aspects, and this description is not meant to foreclose other aspects of the second steam cracker alloy within the broader scope of the invention. Certain exemplary aspects of the second steam cracker alloy comprise 5.0 wt. % to 10.0 wt. % aluminum, 18.0 wt. % to 25.0 wt. % chromium, less than 0.5 wt. % silicon, ≥ 35.0 wt. % iron, with the ≥90.0 wt. % of balance of the second steam cracker alloy being nickel, such as ≥95.0 wt. %, or ≥99.9 wt. %. The second steam cracker alloy can be welded to the inner surface of the specified first tubular member, e.g., by plasma powder welding.

The second steam cracker alloy typically is one that forms a protective, carburization-resistant surface layer comprising one or more oxides when subjected to the conditions specified in U.S. Patent Application Publication No. 2012/0097289, which is incorporated by reference herein in its entirety. The oxide layer typically comprises one or more of alumina, chromia, silica, mullite, and spinel. In other aspects, the second steam cracker alloy includes 5.0 wt. % to 8.0 wt. % aluminum, 19.0 wt. % to 24.0 wt. % chromium, ≤0.5 wt. % silicon, and ≥35.0 wt. % iron, with ≥90.0 wt. % of the balance of the second steam cracker alloy being nickel, e.g., ≥95.0 wt. %, such as ≥99.9 wt. %.

In still other aspects, the second steam cracker alloy further comprises one or more optional components. For example, the second steam cracker alloy can further comprise carbon, e.g., ≤0.01 wt. % carbon. The second steam cracker alloy can further comprise 0.1 wt. % to 2.0 wt. % of one or more of Ga, Ge, As, In, Sn, Sb, Pb, Pd, Pt, Cu, Ag, and Au. The second steam cracker alloy can further comprise 0.1 wt. % to 2.0 wt. % of one or more of Re, Ru, Rh, Ir, Pd, Pt, Cu, Ag, and Au. The second steam cracker alloy can further comprise 0.01 wt. % to 2.0 wt. % of one or more of Sc, La, Y, and Ce. The second steam cracker alloy can further comprise 0.01 wt. % to 2.0 wt. % of oxide, typically in the form of particulate of one or more of Al, Si, Sc, La, Y, and Ce. The second steam cracker alloy can further comprise 0.01 wt. % to 4.0 wt. % of one or more of Mn, Ti, Zr, Hf, V, Nb, Ta, Mo, and W. The second steam cracker alloy can further comprise 0.1 wt. % to 30.0 wt. % of at least one intermetallic precipitate, e.g., Ni3Al, NiAl, and/or sigma-phase. The second steam cracker alloy can further comprise 0.01 wt. % to 5.0 wt. % of at least one inclusion, e.g., oxide inclusion, carbide inclusion, nitride inclusion, and/or carbonitride inclusion.

Typically, the second steam cracker alloy in yet another aspect, the second steam cracker alloy includes about 31.0 to about 36.0 wt. % nickel, e.g. about 32.0 to about 34.0 wt. % nickel; about 20.0 to about 22.0 wt. % chromium; about 6.1 to about 6.4 wt. % aluminum; about 37.9 to about 39.9 wt. % iron; and about 0.40 to about 0.45 wt. % silicon.

In yet another advantageous aspect, the second steam cracker alloy includes about 33.0 to about 36.0 wt. % nickel, about 21.7 to about 22.5 wt. % chromium, about 6.7 to about 7.1 wt. % aluminum, about 35.9 to about 36.7 wt. % iron, about 0.16 to about 0.24 wt. % silicon.

In some aspects, the second steam cracker alloy includes about 26.0 to about 39.0 wt. % nickel, about 20.0 to about 22.5 wt. % chromium, about 6.0 to about 8.0 wt. % aluminum, about 35.0 to 40.0 wt. % iron, and≤ about 0.45 wt. % silicon.

In still further aspects, the second steam cracker alloy includes about 31.0 to about 37.0 wt. % nickel, about 20.0 to about 22.0 wt. % chromium, about 6.0 to 6.5 wt. % aluminum, about 37.0 to 40.0 wt. % iron, and ≤0.45 wt. % silicon.

In yet other aspects, the second steam cracker alloy includes about 28.5 to about 40.0 wt. % nickel, about 19.0 to about 24.0 wt. % chromium, about 5.0 to about 7.0 wt. % aluminum, about 35.0 to about 40.0 wt. % iron, and≤ about 0.3 wt. % silicon.

When a plurality of the mixing elements is present in the weldment, each of the mixing elements can comprise substantially the same second steam cracker alloy, but this is not required. In other aspects, the weldment includes a plurality of mixing elements, with at least one mixing element among the plurality having a substantially different composition than the other(s). The mixing element(s) of different composition can include a different second steam cracker alloy, e.g., an alternative second steam cracker alloy that is selected from among the specified second steam cracker alloys. So long as at least one of the plurality of mixing elements comprises at least one of the specified second steam cracker alloys, the remaining mixing elements of the weldment can comprise alloys that are not among those specified as second steam cracker alloys. For example, the weldment can comprise (ii) at least one first mixing element comprising one or more of the specified second steam cracker alloys and (ii) at least one second mixing element, the second mixing element comprising an alloy that is not among the specified second steam cracker alloys (e.g., an alloy that does not contain aluminum). For greatest carburization resistance, it is preferred that each of the plurality of mixing elements comprise at least one of the specified second steam cracker alloys.

The mixing element of the weldment can be produced from the second steam cracker alloy by plasma powder welding the second steam cracker alloy on the inner surface of the first tubular member. When used as a furnace tube in hydrocarbon pyrolysis service, the specified oxide layer (or multi-layer) can be formed in-situ during the pyrolysis. Alternatively, or in addition, the specified oxide layer or multi-layer can be produced by exposing the interior surface of the weldment (including the exposed surface of the mixing element) to the controlled low oxygen partial pressure environment specified in U.S. Patent Application Publication No. 2012/0097289. For example, the formation of the specified oxide layer can be carried out by exposing the weldment's interior surface to a temperature in the range of from 500° C. to 1200° C. for a time in the range of from about 1 hour to about 500 hours in the presence of a controlled low oxygen partial pressure environment comprising one or more of (i) a gaseous mixture of $H_2O$ and $H_2$, (ii) a gaseous mixture of CO and $CO_2$, and optionally (iii) one or more gases selected from $CH_4$ or other hydrocarbon gases, $NH_3$, $N_2$, $O_2$, and Ar. Optionally, the interior surface of the weldment can be further treated by one or more densifying treatment, e.g., post-annealing, tempering and/or laser melting. If desired, at least a portion of the surface roughness of weldment's interior surface (e.g., all or a portion of the mixing element's exposed surface) can be lessened, e.g., by a method one or more of mechanical polishing, electro polishing, and lapping. Typically, the weldment's interior surface (including the mixing element's exposed surface) has an average surface roughness (Ra) of less than 1.1 μm.

Utilizing the specified mixing element comprising the specified second steam cracker alloy lessens the a mount of corrosion, coking and/or fouling in the specified weldments when these are utilized as heat exchange tubes in hydrocarbon processing, e.g., in fired heater tubes and transfer tine exchangers for the transport of hydrocarbon feedstock in refinery and petrochemical process operations, and in particular as pyrolysis furnace tubes.

Carburization-Resistant Layer

The weldments described herein include a protective layer (e.g., a scale) in the weldment's internal channel. The protective layer, referred to herein as a carburization-resistant layer, lessens the weldment's tendency toward carburization during steam cracking, particularly proximate to (i) the first tubular member's inner surface and (ii) the mixing element's surface. The term "carburization-resistant" in this context means that the layer lessens the diffusion of carbon into the first and/or second steam cracker alloy. The presence of a carburization-resistant layer on the exposed surface of the mixing element can be detected by exposing that surface for 24 hours to at least one of the specified hydrocarbon feeds under steam cracking conditions which include a temperature ≥1050° F. (566° C.) and a pressure ≥2 bar and then measuring the amount of carbon that has diffused into the alloy. The presence of a carburization-resistant layer is indicated when the amount of carbon that has diffused into the second steam cracker alloy is ≤0.1 wt. %.

The carburization-resistant layer comprises alumina and typically forms over (i) at least a portion, e.g., ≥90 area %, such as or ≥95 area %, or ≥99 area %, or ≥99.9 area %, substantially all, essentially all, or 100 area % of the exposed inner surface of the first tubular member and (ii) the exposed surfaces of the mixing element. In some aspects, the carburization-resistant layer may be described as substantially free of chromium, particularly a layer that is substantially free of chromium carbide. In other aspects, chromium-containing particles may be dispersed in the portion of the carburization-resistant layer adjacent alloy of the first tubular member and/or the at least on mixing element. The chromium concentration in this region may be higher than that of the alloy over which the carburization-resistant layer forms. In particular aspects, the carburization-resistant layer comprises $Al_2O_3$, e.g., 70 to 100 wt. % $Al_2O_3$, 80 to 100 wt. % $Al_2O_3$, 85 to 99 wt. % $Al_2O_3$.

So long as the carburization layer is sufficiently thick so as to lessen the amount of carburization during hydrocarbon pyrolysis without an undesirable amount of spalling, the carburization-resistant layer's thickness is not particularly critical. The carburization-resistant layer on the mixing element's exposed surface (that portion of the mixing element's surface that is not in contact with the first tubular member) typically comprises one or more oxide, e.g., alumina. Although monolayer oxides are within the scope of the invention, the exposed surface can have multi-layer oxide structure. The oxide layer (monolayer or multi-layer) typically has a thickness in the range of from about 1 μm to about 100 μm. In some exemplary aspects the carburization-resistant layer may be ≥1.0 nm, e.g., ≥ about 5.0 nm, such as ≥ about 10.0 nm, or ≥ about 25.0 nm, or ≥ about 50.0 nm, or ≥ about 100.0 nm, or ≥ about 1.0 μm, or ≥ about 5.0 μm, or ≥ about 7.5 nm. Additionally or alternatively, the thickness of the carburization-resistant layer may be ≤ about 10.0 μm, e.g., ≤ about 7.5 μm, or ≤ about 5.0 μm, or ≤ about 1.0 μm, or ≤ about 100.0 nm, or ≤ about 50.0 nm, or ≤ about 25.0 nm, or ≤ about 10.0 nm, or ≤ about 5.0 nm. Exemplary ranges of the carburization-resistant layer include combinations of any of the above-enumerated values, e.g., 1.0 nm to 100.0 μm, or from 10.0 nm to 50.0 μm, or 100.0 nm to 10.0 μm. Optionally, the carburization-resistant layer is of substantially uniform thickness, but this is not required. In certain aspects the thickness of that portion of the carburization-resistant layer located on the mixing element is thicker than the portion located on the remainder of the tubular member's inner surface. Alternatively, or in addition, the thickness of the weldment's carburization-resistant layer proximate to the tubular member's outlet can be greater than the thickness proximate to the tubular member's inlet, or vice-versa. In other aspects, the carburization-resistant layer's thickness is greatest at a location between the tubular member's inlet and outlet.

In certain aspects, the carburization-resistant layer may be formed by exposing the weldment to a controlled low oxygen partial pressure environment, including gaseous environments having thermodynamic oxygen partial pressures less than that of air. Non-limiting examples of a controlled low oxygen partial pressure environment are a refinery or petrochemical plant steam, gaseous $H_2O:H_2$ mixture and a gaseous $CO_2:CO$ mixture. The controlled low oxygen partial pressure environment may further contain other gases such as $CH_4$, $N_2$, $O_2$, He, Ar and hydrocarbons, which may further enable formation of carburization-resistant layer. Therefore, the carburization-resistant layer may be formed prior to exposure of the weldment to steam cracking process conditions. Suitable temperatures for the controlled low oxygen partial pressure environment are typically≥ about 500° C., e.g., 500° C. to 1200° C., or from 600° C. to 1100° C. Exposure times are typically≥ about 1 hour, e.g., 1 hour to 500 hours, or from 1 hour to 300 hours, or from 1 hour to 100 hours.

The foregoing carburization-resistant layer may alternatively be formed by machining the inner surface of first tubular member and the surfaces of the at least one mixing element to a surface roughness (Ra) of 0.05 to 2.5 and thereafter heat-treating the interior of the weldment in an oxidizing atmosphere of at least 1050° C. In the case where this heat treatment is conducted at a temperature of below 1050° C. (but not lower than 900° C.), the lower limit for the rare earth elements in the first and second steam cracker alloys should be 0.06 wt. %, with the upper limit for tungsten set at 6 wt. %.

In aspects where the carburization-resistant layer is formed by heat treatment, e.g., by exposing the mixing element and/or inner surface of the tubular member to a temperature of at least 1050° C. in an oxidizing atmosphere, the formation of $Al_2O_3$ in the carburization-resistant layer is facilitated by a rare earth element concentration of ≥0.005 wt. %.

Optional Second Tubular Member

Weldments according to aspects of the invention described herein optionally include an outer tubular member in surface contact with the outer surface of the first tubular member. The second tubular member is particularly useful where the ductility of the first tubular member is undesirably low. The second tubular member may be included in the weldment as disclosed in U.S. Patent App. Pub. No. 2012/0097289. Optionally, the first tubular member is in the form of a coating on the inner surface of the second tubular member. The second tubular member comprises at least one third steam cracker alloy, the third steam cracker alloy typically having greater ductility than does the first steam cracker alloy. The third steam cracker alloy typically contains less aluminum on a weight basis compared to the first steam cracker alloy. Optionally, the third steam cracker alloy is essentially-free of aluminum, meaning that aluminum is present at a concentration indicative of impurities, e.g., ≤ about 0.2 wt. %, or ≤ about 0.1 wt. %, or ≤ about 0.05 wt. %, or ≤ about 0.03 wt. %, or ≤ about 0.02 wt. %, or ≤ about 0.01 wt. %, or at an undetectable amount.

Suitable third steam cracker alloys include those comprising at least 18.0 wt. % Cr and 10.0 wt. % Ni, and advantageously at least 20.0 wt. % Cr and 30.0 wt. % Ni. Non-limiting examples of such an alloy include HP45Nb, HP16Nb, HN10NiNb, HP 40 Mod, Manoir HP 40 W, Manoir Manaurite XM, Manoir Manaurite XTM, and Kubota KHR 45A. Table 1 lists certain alloys that are suitable for use as third steam cracker alloy.

TABLE 1

Exemplary Non-Al-Containing Third Steam Cracker Alloys

| Ex | C | Si | Mn | Cr | Ni | W | Mo | Zr | Nb | P | S | Fe |
|---|---|---|---|---|---|---|---|---|---|---|---|---|
| 1 | 0.09-0.12 | 0.8-1.3 | 1.3-1.6 | 18-23 | 31-34 | | ≤0.2 | 0.23 | 0.8-1.0 | ≤0.02 | ≤0.02 | 38-48 |
| 2 | 0.37-0.45 | 1.5-2.0 | | 23-26 | 34-37 | trace | ≤1.25 | | Tr | | | 33-41 |
| 3 | 0.37-0.50 | 1.5-2.0 | | 24-27 | 33-37 | 3.8-5 | ≤1.5 | | | | | 27-37 |
| 4 | 0.37-0.50 | 1.0-2.0 | | 23-28 | 33-38 | | 1.0-1.5 | Tr | Tr | | | 30-42 |
| 5 | 0.40-0.45 | 1.0-2.0 | | 34-37 | 43-48 | | 1.0-2.0 | | Tr | | | 10-21 |
| 6 | | ≤2.0 | ≤2.0 | 30-35 | 40-46 | | | | Tr | | | 15-30 |
| 7 | 0.4-0.5 | 1.2-1.8 | 1.2-1.7 | 23-27 | 33-38 | | ≤0.2 | | 0.6-1.6 | ≤0.02 | ≤0.02 | 29-41 |
| 8 | 0.14-0.18 | 1.2-1.8 | 1.2-1.6 | 22-26 | 35-37 | | ≤0.2 | | | ≤0.02 | ≤0.02 | 33-41 |

Test Methods

Chemical composition may be determined by electron probe micro-analyzer (EPMA). EPMA is fundamentally the same as scanning electron microscopy (SEM) with the added capability of chemical analysis. The primary importance of EPMA is the ability to acquire precise, quantitative elemental analyses by wavelength dispersive spectroscopy (WDS). The spatial scale of analysis, combined with the ability to create detailed images of the sample, makes it possible to analyze materials in situ and to resolve complex chemical variation within single phases.

Roughness is routinely expressed as the arithmetic average roughness (Ra). The arithmetic average height of roughness component of irregularities from the mean line is measured within the sample length L. The standard cut-off is 0.8 mm with a measuring length of 4.8 mm. This measurement conforms to ANSI/ASME B46.1 "Surface Texture—Surface Roughness, Waviness and Lay", which was employed in determining the surface roughness in accordance with the present disclosure.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the invention, including all features which would be treated as equivalents thereof by those skilled in the art to which the invention pertains.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Unless otherwise stated, all percentages, parts, ratios, etc. are by weight. Unless otherwise stated, a reference to a compound or component includes the compound or component by itself, as well as in combination with other compounds or components, such as mixtures of compounds. Likewise, the term "comprising" is considered synonymous with the term "including". Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa. Aspects of the invention include those that are substantially free of, essentially free of, or completely free of any element, step, composition, ingredient or other claim element not expressly recited or described.

The invention claimed is:

1. A pyrolysis process, comprising:
   (a) providing a pyrolysis furnace, the pyrolysis furnace comprising at least one radiant tube, wherein the radiant tube includes (i) a tubular member comprising a first steam cracker alloy which includes aluminum, the first tubular member having inner and outer surfaces, and (ii) one or more mixing elements in surface contact with the inner surface of the tubular member, at least one of the mixing elements comprising a second steam cracker alloy which includes aluminum;
   (b) providing hydrocarbon and steam;
   (c) combining at least a portion of the hydrocarbon with at least a portion of the steam to produce a hydrocarbon+steam mixture, and introducing the hydrocarbon+steam mixture into the radiant tube; and
   (d) exposing the hydrocarbon+steam mixture in the radiant tube to pyrolysis conditions to thermally crack at least a portion of the hydrocarbon; the tubular member's aluminum content being sufficient for forming an alumina-containing carburization-resistant scale on the tubular member's inner surface under the pyrolysis conditions, and the second tubular member's aluminum content being sufficient for forming an alumina-containing carburization-resistant scale on the mixing element under the pyrolysis conditions; and wherein before step (d), the first steam cracker alloy comprises ≥2.0 wt. % aluminum, based on the weight of the first steam cracker alloy, and the second steam cracker alloy comprises ≥2.0 wt. % aluminum, based on the weight of the second steam cracker alloy.

2. The process of claim 1, wherein the hydrocarbon comprises one or more of steam cracked gas oil, steam cracked residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams, vacuum pipestill bottoms, wide boiling range naphtha condensates, gas oil condensates, heavy non-virgin hydrocarbon streams, vacuum gas oils, heavy gas oil, naphtha contaminated with crude, atmospheric residue, heavy residue, $C_4$/residue admixture, naphtha/residue admixture, gas oil/residue admixture, and crude oil.

3. The process of claim 1, wherein the hydrocarbon has a nominal final boiling point of at least about 600° F.

4. The process of claim 1, wherein the hydrocarbon comprises saturated hydrocarbon molecules having fewer than five carbon atoms.

5. The process of claim 1, wherein the hydrocarbon comprises ethane and/or propane.

6. The process of claim 1, wherein the pyrolysis conditions include a temperature ≥1050° F. (566° C.) and a pressure ≥2 bar.

7. The process of claim 1, wherein (i) the carburization-resistant scale on the mixing element does not contain chromium and/or (ii) the carburization-resistant scale on the tubular member's inner surface does not contain chromium.

8. The process of claim 1, wherein (i) the carburization-resistant scale on the mixing element has a thickness in the range of from 1 µm to 100 µm, (ii) the carburization-resistant scale on the tubular member's inner surface has a thickness in the range of from 1 µm to 100 µm, and (iii) the carburization-resistant scale located on the mixing element is thicker than the carburization-resistant scale located on the tubular member's inner surface.

9. The process of claim 1, wherein (i) the carburization-resistant scale on the mixing element has a thickness in the range of from 1 µm to 100 µm and (ii) the carburization-resistant scale on the tubular member's inner surface has substantially the same thickness as that on the mixing element.

10. A method for forming a carburization-resistant layer, the method comprising exposing a weldment to a controlled low oxygen partial pressure environment at a temperature in the range of 500° C. to 1200° C. for a time ≥ about 1 hour, wherein (i) air has an oxygen partial pressure $PP_1$ and (ii) the low oxygen partial pressure environment has a thermodynamic oxygen partial pressures that is less than $PP_1$; and wherein the weldment includes
   (a) a first tubular member comprising a first steam cracker alloy and having inner and outer surfaces; and
   (b) one or more mixing elements in surface contact with the inner surface of the first tubular member, at least one of the mixing elements comprising a second steam cracker alloy, wherein
      (i) the first steam cracker alloy comprises $A_1$ wt. % aluminum, based on the weight of the first steam cracker alloy,
      (ii) the second steam cracker alloy comprises $A_2$ wt. % aluminum, based on the weight of the second steam cracker alloy, and
      (iii) $A_1$ is ≥2.0 wt. % and $A_2$ is ≥2.0 wt. %.

11. A method for forming a carburization-resistant layer, comprising
   (A) providing a weldment that includes
      (a) a first tubular member comprising a first steam cracker alloy and having inner and outer surfaces; and
      (b) at least one mixing element in surface contact with the inner surface of the first tubular member, the mixing element comprising a second steam cracker alloy, wherein
         (i) the first steam cracker alloy comprises $A_1$ wt. % aluminum, based on the weight of the first steam cracker alloy,
         (ii) the second steam cracker alloy comprises $A_2$ wt. % aluminum, based on the weight of the second steam cracker alloy, and
         (iii) $A_1$ is ≥2.0 wt. % and $A_2$ is ≥2.0 wt. %; and
   (B) machining the inner surface of first tubular member and the mixing element's surface to achieve on each a surface roughness (Ra) in the range of 0.05 to 2.5; and
   (C) heat-treating the interior of the weldment in an oxidizing atmosphere at a temperature not less than 900° C.

12. A method for forming a carburization-resistant layer, comprising
   (A) providing a weldment that includes
      a first tubular member comprising a first steam cracker alloy and having inner and outer surfaces; and at least one mixing element in surface contact with the inner surface of the first tubular member, the mixing element comprising a second steam cracker alloy, wherein
         (i) the first steam cracker alloy comprises ≥2.0 wt. % aluminum, based on the weight of the first steam cracker alloy, and
         (ii) the second steam cracker alloy comprises ≥2.0 wt. % aluminum, based on the weight of the second steam cracker alloy,
   (B) heat-treating the interior of the weldment in an oxidizing atmosphere at a temperature not less than 900° C.

13. The method of claim 12, wherein the first steam cracker alloy comprises 2.0 wt. % to 10.0 wt. % of aluminum and/or the second steam cracker alloy comprises 2.0 wt. % to 10.0 wt. % of aluminum.

* * * * *